United States Patent [19]

Lewis

[11] 4,165,828
[45] Aug. 28, 1979

[54] AUTOMATIC ARTICLE CLAMPING DEVICE

[76] Inventor: Jerry J. Lewis, 840 Cooper Ave., Los Angeles, Calif. 90042

[21] Appl. No.: 889,380

[22] Filed: Mar. 23, 1978

[51] Int. Cl.² .............................................. B60R 7/04
[52] U.S. Cl. ....................... 224/42.42 A; 224/42.45 B; 211/31; 248/316 F
[58] Field of Search ................. 224/42.42 R, 42.42 A, 224/42.1 C, 42.45 R, 42.45 A, 42.46 R, 42.46 A, 42.45 B, 42.46 B, 29 B, 29 R, 29 M; 248/316 E, 316 F, 316 R; 211/30, 31, 32; 206/8; 297/188, 191; 24/248, 255, 191, 170

[56] References Cited
U.S. PATENT DOCUMENTS

| 1,540,291 | 6/1925 | Sessions | 248/316 F X |
| 2,056,878 | 10/1936 | Wineholt | 211/31 UX |
| 2,518,563 | 8/1950 | Myers | 211/31 UX |
| 3,226,156 | 12/1965 | Hamlin | 211/31 X |
| 3,434,686 | 3/1969 | Yoshizaburo | 248/316 F |

FOREIGN PATENT DOCUMENTS 769425  3/1957  United Kingdom ................ 248/316 F Primary Examiner—Robert J. Spar
Assistant Examiner—Jerold M. Forsberg
Attorney, Agent, or Firm—Sellers and Brace

[57] ABSTRACT

An article clamping device having an article inlet equipped with toggle link means mounted thereacross and pivoting to receive the article and thereupon holding the article captive until deliberately withdrawn. The withdrawal is facilitated by the flexibility of one of the device components.

5 Claims, 4 Drawing Figures

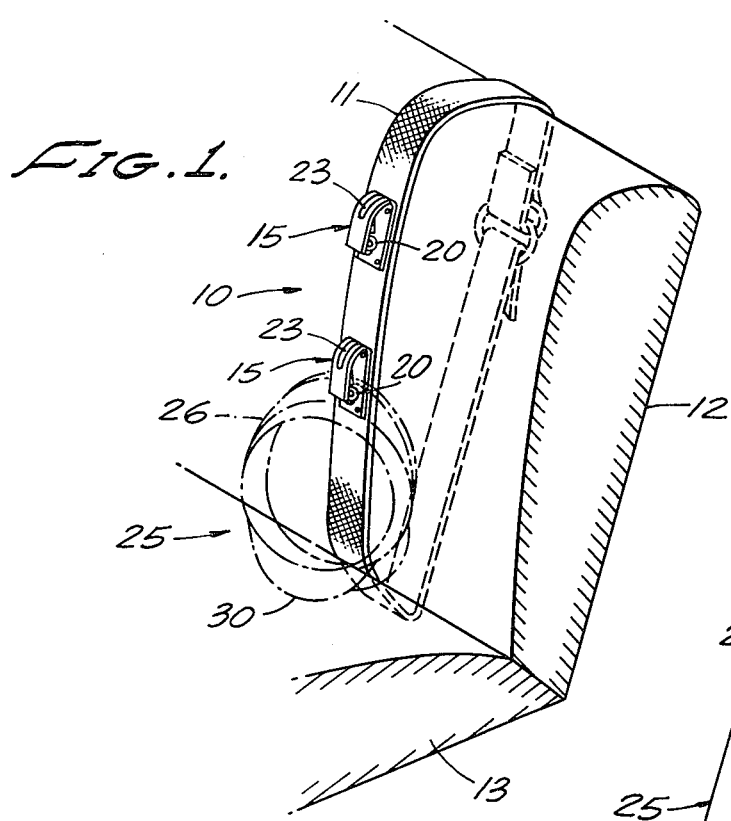
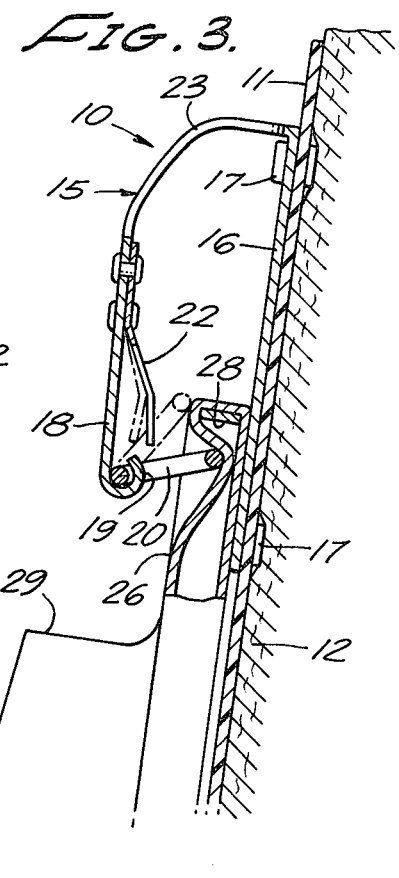
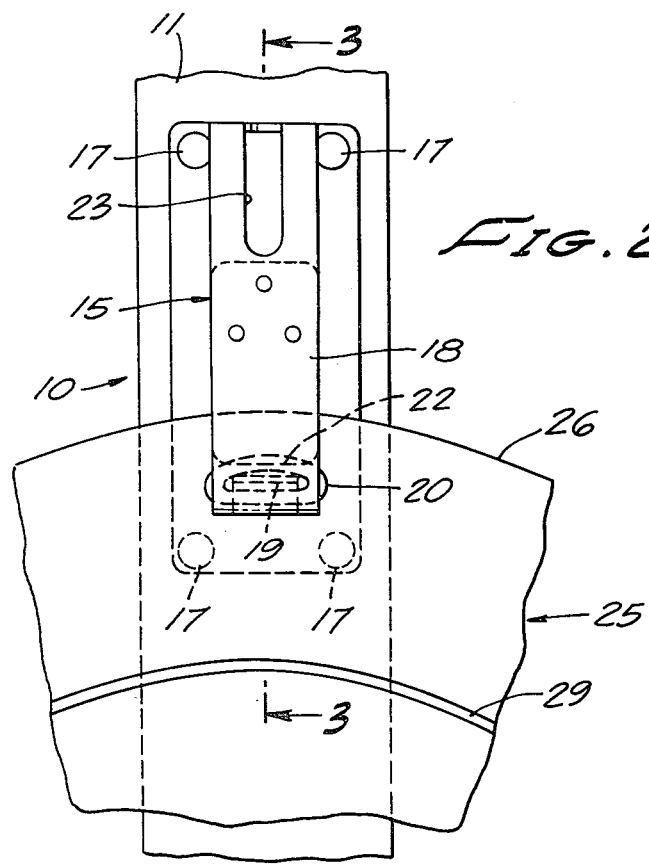
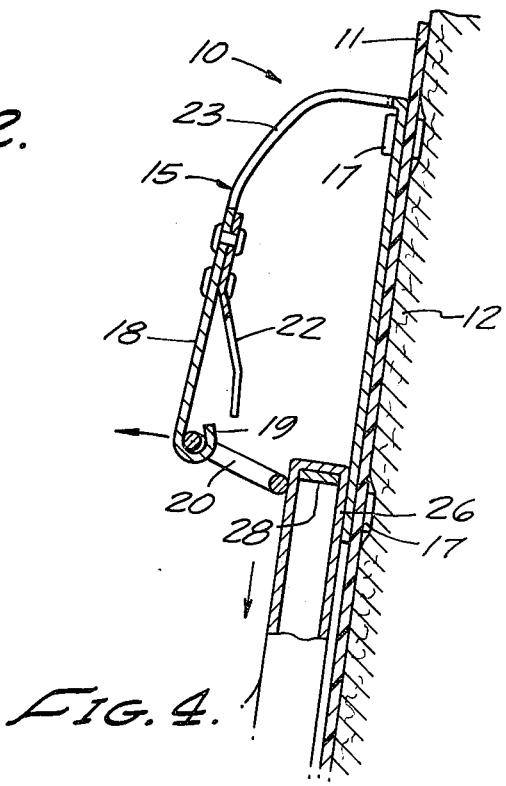

AUTOMATIC ARTICLE CLAMPING DEVICE

This invention relates to clamping devices, and more particularly to a unique and improved article clamp or retainer which opens to receive an article and thereupon retains it captive until deliberately withdrawn.

BACKGROUND OF THE INVENTION

A variety of proposals have been made heretofore for automatic and semi-automatic article retension devices so designed that the article can be reliably retained captive simply by an insertion movement and later withdrawn. Particular attention has been given to clamping devices or retainers for headwear of various types including caps and hats having wide brims. Typical patents representative of the state of the prior art include U.S. Pat. Nos. Bishop 740,734, James 1,655,609, Wiezel 1,919,003, Wood 2,075,970, Hamlin 3,226,156 and La Croix 3,465,930. Bishop's hat holder comprises a three component clamp utilizing a friction grip device which must be locked and unlocked by a manually operated locking lever. James utilizes a friction grip device which is locked closed by a manually manipulated locking ring cooperating with notches to lock the clamp closed aginast the hat brim. Wiezel shows a hat clamp pivotally supported on a parallelogram linkage one link of which includes a hat brim clamping member. Wood's hat holder has a push button which must be manually depressed to insert a hat brim and then released to permit a toggle spring to retain the hat captive. Hamlin's hat holder utilizes a beaded chain loop sized to embrace the crown of a hat and retain it captive against the backrest of a vehicle seat.

SUMMARY OF THE INVENTION

This invention avoids various shortcomings and disadvantages of the foregoing and other prior article and headwear retension devices, its construction and operating principles being exemplified in an embodiment here shown to hold a visor-equipped cap safely and securely suspended when not being worn. Such caps are in common use by military personnel, security guards, law enforcement officials and service vehicle operators. Typically, such caps have a circular flat crown held extended by an internal hoop, the underlying skirt portion of the crown being gathered and secured to a headband provided with a visor. While users of such caps are passengers of a motor vehicle, the cap may be securely supported by the invention clamping device secured to some part of the vehicle such as the seat backrest. The clamp proper comprises two principal parts, one being an inverted U-shaped main body having one leg equipped with mounting means and the other being provided with a pivoting toggle link. This link is pivotable through a short arc crosswise of the entrance end of the clamp and swings freely upwardly as the rim of the crown is inserted and thereupon automatically gravitates toward but short of a horizontal position to retain the cap firmly captive. Either the toggle link or one leg of the main body is made resilient with a strength such that a firm withdrawal movement deliberately applied to the cap visor releases the cap and leaves the toggle link in readiness for reuse.

Accordingly, it is the primary object of this invention to provide an improved unique article clamping device having a downwardly facing inlet equipped with toggle link means readily permitting the entry of an article and responsive to a slight withdrawal movement to clamp the same firmly captive until deliberately withdrawn.

Another object of the invention is the provision of an article clamping device having a U-shaped main body equipped with a toggle link pivotally supported crosswise of its entrance and automatically effective to receive and grip an article and to release it by a deliberately applied withdrawal force.

Another object of the invention is the provision of a head gear supporting device detachably mountable on the backrest of a vehicle seat and equipped with a head gear holding device which automatically receives and clamps a head gear and later releases it when a pulling force is applied to the head gear.

These and other more specific objects will appear upon reading the following specification and claims and upon considering in connection therewith the attached drawing to which they relate.

Referring now to the drawing in which a preferred embodiment of the invention is illustrated:

FIG. 1 is a perspective view showing an illustrated embodiment of the invention clamping device mounted on the backrest of a vehicle seat;

FIG. 2 is a fragmentary front elevational view on an enlarged scale showing a cap held captive in the device;

FIG. 3 is a cross sectional view taken along line 3,3 in FIG. 2; and

FIG. 4 is a cross sectional view similar to FIG. 3 but showing the cap partially withdrawn.

Referring initially more particularly to FIGS. 1 through 3, there is illustrated an embodiment of the article clamping device, designated generally 10, mounted on a flexible belt 11, snugly embracing the backrest 12 of a vehicle seat 13. Belt 11 may be provided with any suitable separable fastener means for holding the same in place. The clamp proper 10 has an inverted U-shaped main body 15 one leg 16 of which is secured to belt 11 as by rivits 17. The other leg 18 is provided with a tang 19 formed into a curl pivotally supporting a rectangular toggle member 20 to leg 18. As is best shown in FIG. 2, curl 19 has a width substantially shorter than the width of leg 18 and the portions of leg 18 to either side of the lateral edges of curl 19 are notched to form a ledge or shelf underlying toggle member 20 thereby limiting the downward pivotal movement of the toggle member as is shown in FIG. 4. In other words the toggle member can pivot clockwise about curl 19 to about the 4 O'clock position, and clockwise movement is also preferably limited to about the 1 O'clock position as by a suitable stop on leg 19 such as that provided by the spring leaf 22. This spring stop is positioned as shown in FIGS. 3 and 4 and provides a bias urging the toggle to pivot to a position gripping the inserted article firmly captive as illustrated in FIG. 3. Main body 15 of the clamp is preferably made of resilient material and its bight portion may be provided with a slot or cut-out 23 to increase the flexibility of leg 18.

The operation of the clamping device may be illustrated while in use to support a military type visor-equipped cap 25 of the type having a circular fabric crown held expanded by an internal flexible hoop 28. The underside of this crown is tailored and gathered into a smaller diameter headband portion 29 to which a suitable visor 30 is secured. The wearer removes the cap by gripping the visor 30 in the usual manner and then inserts the diametrically opposite portion of the crown through the inlet of clamping device 15. As this crown is inserted the relatively rigid portion enclosing hoop 28 engages toggle member 20 which pivots freely upwardly. Once hoop 28 has by-passed member 20 the cap is released and starts to gravitate out of the clamp inlet. However, this retrograde movement is immediately arrested by toggle member 20 which pivots in a direction to clamp the adjacent flexible portion of the crown against leg 16 thereby retaining the cap firmly captive. The cap is quickly and readily released if the user grasps the visor or another part of the cap and pulls downwardly on it. This withdrawl effort forces the toggle member to flex leg 18 outwardly sufficiently to permit the cap to be withdrawn in the manner best shown in FIG. 4.

While the particular automatic article clamping device herein shown and disclosed in detail is fully capable of attaining the objects and providing the advangates hereinbefore stated, it is to be understood that it is merely illustrative of the presently preferred embodiment of the invention and that no limitations are intended to the detail of construction or design herein shown other than as defined in the appended claims.

I claim:

1. Toggle clamp means for releasably gripping a military-type cap and holding the same captive inwardly from the hoop-expanded crown thereof comprising:
   a U-shaped strip of resilient material having a bight portion and two legs, one of said legs fixedly securable to a support with the open end facing downwardly;
   toggle means movably supported on the outer end of one of said legs and free to pivot through a limited arc crosswise of the open end of said U-shaped strip;
   said toggle means being freely pivotable vertically to either side of a horizontal plane lying generally normal to said legs, said toggle means normally lying pivoted downwardly below said horizontal plane and being pivotable upwardly above said horizontal plane to admit the hoop-expanded crown of a cap between the legs of said U-shaped strip and then being pivotable downwardly toward but inclined upwardly above said horizontal plane and thereby cooperating with said legs to hold the cap firmly captive; and
   whereby a deliberate downward withdrawal force applied to a cap held captive by said toggle clamp means is effective to pivot said toggle means downwardly past said horizontal plane and to flex the legs of said strip apart thereby to release the cap from said toggle clamp means.

2. Toggle clamp means as defined in claim 1 characterized in that said toggle means includes means biasing the same downwardly after being pivoted upwardly by an article inserted upwardly therepast.

3. Toggle clamp means as defined in claim 1 characterized in that said support therefor comprises means mountable against one surface of a vehicle backrest with the open end of said U-shaped means facing downwardly.

4. Toggle clamp means as defined in claim 1 characterized in that said support for said U-shaped means comprises fastener equipped belt means sized to embrace the backrest of a vehicle seat thereby to support said clamp means vertically of one face thereof with the inlet of said U-shaped clamp means facing downwardly.

5. Toggle clamp means as defined in claim 4 characterized in that a plurality of said toggle clamp means are secured to spaced apart areas of said belt means with the inlets thereof facing in the same direction.

* * * * *